(12) United States Patent
Mukherjee et al.

(10) Patent No.: US 10,248,420 B2
(45) Date of Patent: Apr. 2, 2019

(54) MANAGING LOCK AND UNLOCK OPERATIONS USING ACTIVE SPINNING

(71) Applicant: Cavium, LLC, Santa Clara, CA (US)

(72) Inventors: Shubhendu Sekhar Mukherjee, Southborough, MA (US); Isam Wadih Akkawi, Santa Clara, CA (US); David Asher, Sutton, MA (US); Michael Bertone, Marlborough, MA (US); David Albert Carlson, Haslet, TX (US); Bradley Dobbie, Cambridge, MA (US); Richard Eugene Kessler, Northborough, MA (US)

(73) Assignee: Cavium, LLC, Santa Clara, CA (US)

( * ) Notice: Subject to any disclaimer, the term of this patent is extended or adjusted under 35 U.S.C. 154(b) by 93 days.

(21) Appl. No.: 15/609,211

(22) Filed: May 31, 2017

(65) Prior Publication Data

US 2018/0293113 A1    Oct. 11, 2018

Related U.S. Application Data

(60) Provisional application No. 62/481,891, filed on Apr. 5, 2017.

(51) Int. Cl.
*G06F 9/30*    (2018.01)
*G06F 9/52*    (2006.01)
(Continued)

(52) U.S. Cl.
CPC ........ *G06F 9/3009* (2013.01); *G06F 9/30072* (2013.01); *G06F 9/30079* (2013.01);
(Continued)

(58) Field of Classification Search
CPC . G06F 9/3009; G06F 9/30072; G06F 9/30079
(Continued)

(56) References Cited

U.S. PATENT DOCUMENTS 5,678,026 A    10/1997  Vartti et al.
6,598,068 B1    7/2003  Clark
(Continued)

FOREIGN PATENT DOCUMENTS

CA    2233407 A1    10/1998
EP    0783152 A2    7/1997
(Continued)

OTHER PUBLICATIONS

Chabbi, Milind, Michael Fagan, and John Mellor-Crummey. "High performance locks for multi-level NUMA systems." In ACM SIGPLAN Notices, vol. 50, No. 8, pp. 215-226. ACM, 2015.
(Continued)

*Primary Examiner* — Christopher B Shin
(74) *Attorney, Agent, or Firm* — Young Basile Hanlon & MacFarlane, P.C.

(57) ABSTRACT

Managing instructions on a processor includes: executing threads having access to a stored library of operations. For a first thread executing on the first processor core, for each instruction included in the first thread and identified as being associated with a lock operation corresponding to a particular lock, the managing includes determining if the particular lock has already been acquired for another thread executing on a processor core other than the first processor core, and if so, continuing to perform the lock operation for multiple attempts using a hardware lock operation different from the lock operation in the stored library, and if not, acquiring the particular lock for the first thread. The hardware lock operation performs a modified atomic operation that changes a result of the hardware lock operation for failed attempts to acquire the particular lock relative to a result of the lock operation in the stored library.

20 Claims, 2 Drawing Sheets

(51) Int. Cl.
   *G06F 9/48* (2006.01)
   *G06F 9/54* (2006.01)
   *G06F 9/46* (2006.01)

(52) U.S. Cl.
   CPC ............ *G06F 9/4881* (2013.01); *G06F 9/526* (2013.01); *G06F 9/528* (2013.01); *G06F 9/546* (2013.01)

(58) Field of Classification Search
   USPC ........................................................ 710/200
   See application file for complete search history.

(56) References Cited

U.S. PATENT DOCUMENTS

| | | | |
|---|---|---|---|
| 7,117,481 B1* | 10/2006 | Agesen | G06F 9/526 717/120 |
| 7,143,410 B1* | 11/2006 | Coffman | G06F 9/526 718/100 |
| 7,275,247 B2 | 9/2007 | Mendoza et al. | |
| 7,278,141 B2 | 10/2007 | Accapadi et al. | |
| 7,383,368 B2 | 6/2008 | Schopp | |
| 7,458,076 B2 | 11/2008 | Swanberg et al. | |
| 7,730,491 B2 | 6/2010 | Kukanov et al. | |
| 7,765,547 B2 | 7/2010 | Cismas et al. | |
| 7,765,548 B2 | 7/2010 | Cox | |
| 7,774,570 B2* | 8/2010 | Kinoshita | G06F 3/0617 711/152 |
| 7,788,668 B2 | 8/2010 | Barker | |
| 7,844,973 B1 | 11/2010 | Dice | |
| 8,117,600 B1 | 2/2012 | Roeck et al. | |
| 8,145,817 B2 | 3/2012 | Detlefs | |
| 8,161,481 B2 | 4/2012 | May | |
| 8,966,491 B2 | 2/2015 | Calciu et al. | |
| 9,063,796 B2 | 6/2015 | Giusto et al. | |
| 9,378,069 B2 | 6/2016 | Chiang et al. | |
| 9,471,400 B1 | 10/2016 | Greco | |
| 9,740,525 B2 | 8/2017 | Scheuer | |
| 2001/0014905 A1 | 8/2001 | Onodera | |
| 2002/0083063 A1 | 6/2002 | Egolf | |
| 2003/0182356 A1 | 9/2003 | Limoges et al. | |
| 2004/0098723 A1* | 5/2004 | Radovic | G06F 9/52 718/104 |
| 2004/0216112 A1 | 10/2004 | Accapadi et al. | |
| 2004/0250240 A1* | 12/2004 | Stoodley | G06F 9/45516 717/116 |
| 2005/0081204 A1 | 4/2005 | Schopp | |
| 2005/0080963 A1 | 8/2005 | Schopp | |
| 2006/0031658 A1 | 2/2006 | Swanberg et al. | |
| 2006/0090168 A1* | 4/2006 | Ogasawara | G06F 9/52 719/320 |
| 2006/0117316 A1 | 6/2006 | Cismas et al. | |
| 2006/0282836 A1 | 12/2006 | Barker | |
| 2007/0022429 A1* | 1/2007 | Rosenbluth | G06F 9/52 718/108 |
| 2007/0044103 A1* | 2/2007 | Rosenbluth | G06F 9/526 718/104 |
| 2007/0124728 A1* | 5/2007 | Rosenbluth | G06F 9/526 718/100 |
| 2008/0104600 A1 | 5/2008 | May | |
| 2010/0037242 A1 | 2/2010 | Mannarswamy et al. | |
| 2010/0100889 A1 | 4/2010 | Labrie et al. | |
| 2010/0138836 A1 | 6/2010 | Dice et al. | |
| 2010/0293401 A1 | 11/2010 | de Cesare et al. | |
| 2010/0333110 A1 | 12/2010 | Luo et al. | |
| 2012/0102470 A1 | 4/2012 | Yang et al. | |
| 2012/0159498 A1* | 6/2012 | Wilmarth | G06F 9/526 718/103 |
| 2012/0159514 A1 | 6/2012 | Sigalov et al. | |
| 2012/0311606 A1* | 12/2012 | Marathe | G06F 9/526 718/107 |
| 2013/0046939 A1 | 2/2013 | Waddington et al. | |
| 2013/0290967 A1* | 10/2013 | Calciu | G06F 9/526 718/102 |
| 2014/0006661 A1 | 1/2014 | Chappell et al. | |
| 2014/0040904 A1 | 2/2014 | Giusto et al. | |
| 2014/0258645 A1* | 9/2014 | Dice | G06F 9/467 711/152 |
| 2014/0310688 A1* | 10/2014 | Granshaw | G06F 11/366 717/123 |
| 2014/0372731 A1 | 12/2014 | Nystad et al. | |
| 2015/0248367 A1* | 9/2015 | Tucek | G06F 12/0831 710/308 |
| 2015/0254113 A1 | 9/2015 | Chiang et al. | |
| 2016/0267005 A1* | 9/2016 | Natarajan | G06F 12/0253 |
| 2016/0357791 A1* | 12/2016 | Levandoski | G06F 12/1009 |
| 2017/0039094 A1* | 2/2017 | Dice | G06F 9/526 |
| 2017/0139745 A1 | 5/2017 | Scheuer | |
| 2017/0147487 A1* | 5/2017 | Kogan | G06F 12/0253 |
| 2017/0235557 A1* | 8/2017 | Dang | G06F 8/52 717/153 |
| 2017/0344473 A1* | 11/2017 | Gidra | G06F 12/0261 |
| 2018/0157590 A1* | 6/2018 | Persson | G06F 12/0833 |
| 2018/0225047 A1* | 8/2018 | Mannava | G06F 3/0611 |
| 2018/0234503 A1* | 8/2018 | Lan | G06F 15/177 |
| 2018/0293070 A1 | 10/2018 | Mukherjee et al. | |
| 2018/0293100 A1 | 10/2018 | Mukherjee et al. | |
| 2018/0293114 A1 | 10/2018 | Mukherjee et al. | |

FOREIGN PATENT DOCUMENTS

| | | |
|---|---|---|
| JP | H09198265 A | 7/1997 |
| JP | 2004326783 A | 11/2004 |

OTHER PUBLICATIONS

Sivasubramanian, Swaminathan, John Stultz, Jack F. Vogel, and Paul McKenney. "Fairlocks—A High Performance Fair Locking Scheme." In International Conference on Parallel and Distributed Systems, pp. 241-246.

Vallejo, Enrique, Ramon Beivide, Adrian Cristal, Tim Harris, Fernando Vallejo, Osman Unsal, and Mateo Valero. "Architectural support for fair reader-writer locking." In Proceedings of the 2010 43rd Annual IEEE/ACM International Symposium on Microarchitecture, pp. 275-286. IEEE Computer Society, 2010.

\* cited by examiner

MANAGING LOCK AND UNLOCK OPERATIONS USING ACTIVE SPINNING

CROSS-REFERENCE TO RELATED APPLICATIONS

This application claims the benefit of U.S. Provisional Application No. 62/481,891, filed Apr. 5, 2017, incorporated herein by reference.

BACKGROUND

This description relates to managing lock and unlock operations using active spinning.

A 'lock' is a mechanism that is available in various computing environments for enforcing a mutual exclusion (sometimes called 'mutex') policy. Such a policy may be part of a concurrency control scheme, for example. A lock can be used by a processing entity that is executing on a processor (or on a core of a multi-core processor), such as a thread within a multi-threaded computing environment. One example of a situation in which a lock may be used is when different threads may be able to access the same 'critical section' (or 'critical region') of a program associated with a shared resource, such as a data structure, network connection, or device interface. In order to avoid contention, each thread may be required to acquire a lock associated with a critical section (by performing a lock operation) before accessing that critical section, and then each thread would release the lock (by performing an unlock operation) after its access has been completed. Locks can also be used for other types of mutual exclusion.

One form of standardization for managing threads is an execution model called Portable Operating System Interface (POSIX) Threads (or 'pthreads'), which defines a library of various operations including lock and unlock operations for use in mutual exclusion, such as when accessing a critical section of a program. Some processor architectures provide hardware support for certain aspects of various execution models, such as operations in the pthread library.

SUMMARY

In one aspect, in general, a processor includes: a plurality of processor cores, each configured to execute a plurality of threads, each thread having access to a stored library of operations including at least one lock operation and at least one unlock operation; and instruction management circuitry in at least a first processor core of the plurality of processor cores, the instruction management circuitry configured to manage instructions that are issued on the first processor core, for a first thread executing on the first processor core. The managing includes: for each instruction included in the first thread and identified as being associated with a lock operation corresponding to a particular lock, determining if the particular lock has already been acquired for another thread executing on a processor core other than the first processor core, and if the particular lock has already been acquired, continuing to perform the lock operation for a plurality of attempts using a hardware lock operation different from the lock operation in the stored library, and if the particular lock has not already been acquired, acquiring the particular lock for the first thread, wherein the hardware lock operation performs a modified atomic operation that changes a result of the hardware lock operation for failed attempts to acquire the particular lock relative to a result of the lock operation in the stored library, and for each instruction included in the first thread and identified as being associated with an unlock operation corresponding to a particular lock, releasing the particular lock for the first thread.

In another aspect, in general, a method for managing instructions on a processor comprising a plurality of processor cores. The method includes: executing a plurality of threads on the processor cores, each thread having access to a stored library of operations including at least one lock operation and at least one unlock operation; and managing instructions that are issued on a first processor core of the plurality of processor cores, for a first thread executing on the first processor core. The managing includes: for each instruction included in the first thread and identified as being associated with a lock operation corresponding to a particular lock, determining if the particular lock has already been acquired for another thread executing on a processor core other than the first processor core, and if the particular lock has already been acquired, continuing to perform the lock operation for a plurality of attempts using a hardware lock operation different from the lock operation in the stored library, and if the particular lock has not already been acquired, acquiring the particular lock for the first thread, wherein the hardware lock operation performs a modified atomic operation that changes a result of the hardware lock operation for failed attempts to acquire the particular lock relative to a result of the lock operation in the stored library, and for each instruction included in the first thread and identified as being associated with an unlock operation corresponding to a particular lock, releasing the particular lock from the first thread.

Aspects can include one or more of the following features.

Continuing to perform the lock operation for a plurality of attempts includes continuing to perform the lock operation for a plurality of attempts during which the first processor core is not able to execute threads other than the first thread.

After a predetermined threshold on the plurality of attempts, the first processor core places the first thread into an inactive state that enables the first processor core to temporarily execute threads other than the first thread until the first thread is placed back into an active state.

After releasing the particular lock from the first thread, the first processor core determines if there are any waiting threads executing on a processor core other than the first processor core that were placed into the inactive state after at least one attempt at acquiring the particular lock, and if so, places at least one waiting thread back into the active state.

The hardware lock operation different from the lock operation in the stored library is used in response to the lock operation in the stored library being invoked.

The hardware lock operation different from the lock operation in the stored library is performed by hardware within the first processor core that is configured to perform at least one of the plurality of attempts by re-issuing an instruction within a pipeline of the first processor core.

The re-issuing of the instruction is transparent to software being executed by the first thread.

Interconnection circuitry configured to connect each processor core to a memory system of the processor is configured to preserve prioritization of selected messages associated with instructions identified as being associated with an unlock operation over messages associated with instructions identified as being associated with a lock operation.

The first processor core includes circuitry configured to identify selected instructions as being associated with operations from the stored library, the identifying including, for a plurality of instructions included in a particular thread executing on the processor, identifying a first subset of the plurality of instructions as being associated with a lock operation based on predetermined characteristics of the plurality of instructions, and identifying a second subset of the plurality of instructions as being associated with an unlock operation based on predetermined characteristics of the plurality of instructions.

The selected instructions are identified as being associated with operations from the stored library of operations using issue logic circuitry of a pipeline stage of the first processor core.

Aspects can have one or more of the following advantages.

A lock operation is typically configured to attempt to acquire a lock over multiple attempts (e.g., using an atomic operation) if the first attempt is unsuccessful. If an attempt to acquire a lock is unsuccessful, the lock operation may be configured to trigger the kernel to initiate a 'sleep' mechanism for the thread performing the lock operation to be placed into an inactive state (or 'sleep state') that enables the processor core to temporarily execute threads until that thread is placed back into an active state (or is 'woken up'). If there is contention for a lock, where multiple threads are attempting to acquire the same lock, there may be multiple threads placed into the sleep state, and eventually, each 'sleeping' thread is woken up after the lock is released. Lock/unlock operations that use such a kernel-based sleep mechanism are useful for protecting large critical sections (i.e., having enough instructions to make the overhead involved with entering and leaving the sleep state negligible). But, for small critical sections, such a kernel-based sleep mechanism can potentially cause significant performance degradation due to that overhead, especially when there are a large number of cores in a processor, since contention among threads executing on different cores can cause the average time (in number of cycles) that a core must wait to acquire a lock to grow (approximately linearly) with the number of cores.

In some embodiments, the frequency of use of the kernel-based sleep mechanism can be reduced for lock/unlock operations, or the kernel-based sleep mechanism can be avoided entirely for lock/unlock operations. In one aspect, an 'active spinning' mechanism is used to delay or avoid entering the sleep state when attempting to acquire a lock (during a lock operation). Since the active spinning mechanism might cause lock operations to block subsequent unlock operations, a 'traffic prioritization' mechanism is provided within hardware to ensure that unlock operations are prioritized over lock operations. After an unlock operation is identified, any associated operation message can be assigned a higher priority (than those associated with lock operations), as described in more detail below. Additionally, when mechanisms are implemented at least partially in hardware, it is useful to be able to predict the type of operation being performed without relying on that information from software. For hardware spinning in a lock operation, a prediction mechanism can be used to predict when an instruction is associated with lock operation. For prioritization of an unlock operation, a prediction mechanism can be used to predict when an instruction is associated with an unlock operation.

Other features and advantages of the invention will become apparent from the following description, and from the claims.

DESCRIPTION

Figure 1:
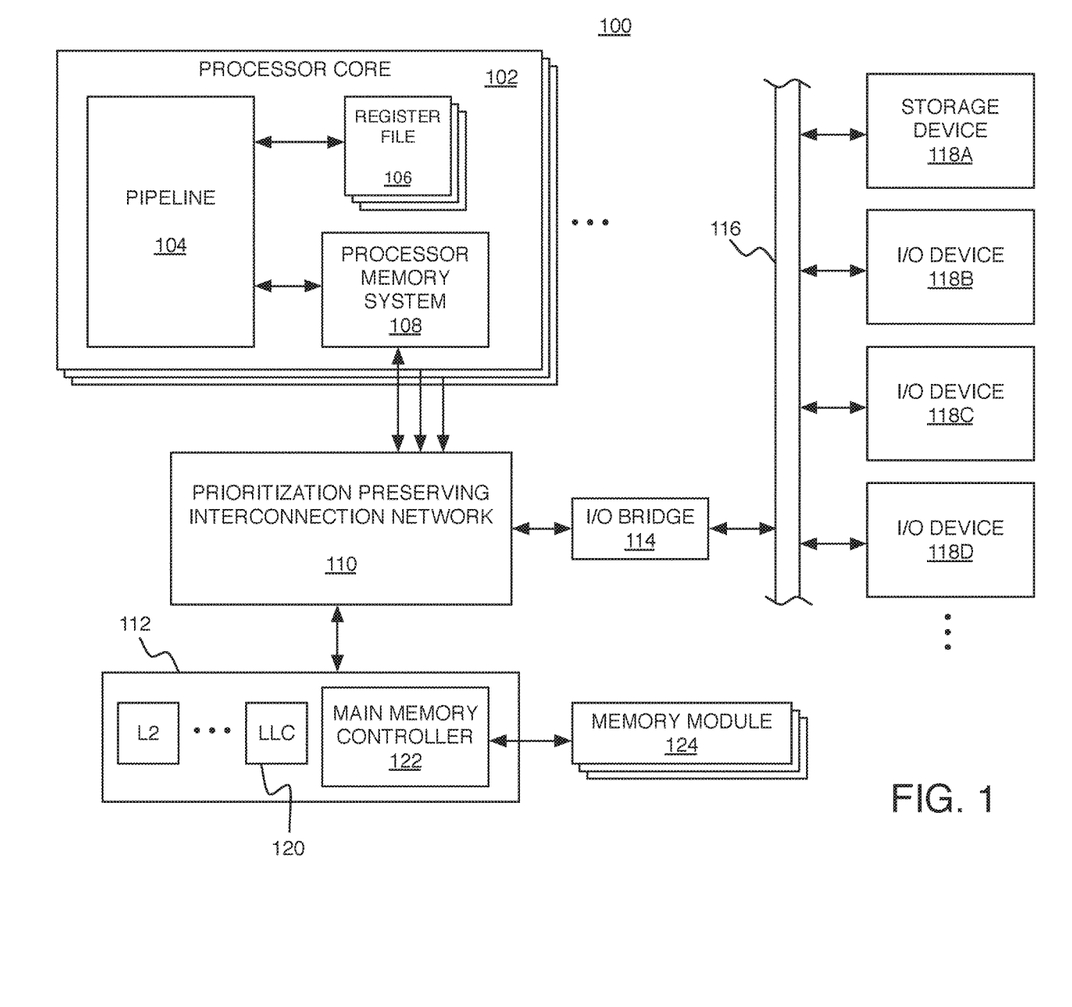
FIG. 1 is a schematic diagram of a computing system.

FIG. 1 shows an example of a computing system 100 in which the lock/unlock management techniques can be used. The system 100 includes processor cores 102 of a multi-core architecture, where each processor core 102 (or each "core") comprises an individual central processing unit (CPU) with associated circuitry. In this example, each processor core 102 includes a pipeline 104 with various pipeline stages (e.g., instruction fetch, instruction decode, instruction issue, execution within functional unit(s) and/or memory access, write back, etc.), one or more register files 106, and a processor memory system 108. Each processor core 102 is connected to a prioritization preserving interconnection network 110 (e.g., bus, cross-bar switch, mesh network, etc.). The interconnection network 110 is configured to preserve different priorities among different operation messages used by various operations representing "requests" for accessing an external memory system 112 and an input/output (I/O) bridge 114. Circuitry within the cores and/or within the interconnection network 110 itself is configured to enable an order in which certain operation messages (e.g., operation messages associated with lock or unlock operations) are transmitted to be determined and preserved. For example, each processor core 102 can be configured to have its own prioritization manager to that places operation messages into different channels based on priority, as described in more detail below. Also, the system ensures that a "prioritized" a request does not conflict with the program ordering model (e.g., how a program is expecting an operation to be visible).

Operation messages sent over the I/O bridge 114 are coupled over an I/O bus 116 to different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L2 cache if there are only two levels in the hierarchy) is the LLC 120, which is accessed just before main memory. Of course, this is only an example. The exact division between which level caches are within the processor memory system 108 and which are in the external memory system 112 can be different in other examples. For example, the L1 cache and the L2 cache could both be internal to the processor core 102, and the L3 (and higher) caches could be external to the processor core 102; or each processor core 102 could have its own internal L1 cache, and the processor cores could share an L2 cache. The external memory system 112 also includes a main memory controller 122, which is connected to any number of memory modules 124 serving as main memory (e.g., Dynamic Random Access Memory modules). The interconnection network 110, external memory system 112, and I/O bridge 114 are configured to support multiple-priority communication channels (e.g., physical channels using distinct electronic signal pathways, or virtual channels that don't require distinct electronic signal pathways) such that they preserve different paths of different priority for transmitting traffic to and from the destinations of the operation messages, as described in more detail below.

One example of an implementation of the interconnection network 110 is a mesh network that comprises a two-dimensional array of nodes, each of which is connected to neighboring nodes to/from the four cardinal directions (north, east, south, west). Each node includes a switch for routing traffic among sets of physical communication channels (e.g., wires) in the four cardinal directions. Each node also includes a cluster of zero to M processor cores 102 and zero to N cache units. The M number of processor cores 102 and N of cache units in any given node may differ (e.g., M=4, N=2), and M and N may differ from node to node. In this example, the LLC 120 is a distributed shared L2 cache and each cache unit is configured to manage a portion of the LLC (e.g., a portion of the tags for cached data). Each switch corresponding to a given node is configured to route traffic to/from the cardinal directions as well as to/from processor cores 120 and cache units associated with that node.

The physical communication channels between the switches are each divided into multiple distinct types of channels, forming multiple sub-mesh networks (e.g., four sub-meshes for different types of messages: Command, Data, Acknowledgement, Credit Return). These sub-mesh networks generally operate independently, with at least one exception. For example, for some operations (e.g., store operations), command messages are associated with data messages. When these messages are transmitted on the mesh network they can be "linked" such that command and data components are re-associated at the destination.

The mesh network can also be configured to provide multiple virtual channels (VCs) over the same physical communication channel, such that there are virtual sub-mesh networks on top of the physical sub-mesh networks. The virtual channels can be configured such that ordering between messages is preserved within a virtual channel for a given source/destination pair, but messages on different virtual channels are allowed to be reordered. VCs can also be used for deadlock avoidance, and for prioritization of one VC over another. In some implementations, a significant portion of the logic circuitry used to support virtual channels is in a receive buffer storage that is managed by per-VC credit counters at the traffic sources.

Some high priority VCs can be dedicated for use by the traffic prioritization scheme described herein. VCs used to process memory store operations from a processor core is a pair of VCs that carry a pair of linked message components: a command message component over a CMD_REQ VC and a data message component over a DAT_REQ VC. A corresponding pair of dedicated high-priority VCs are CMD_RQH and DAT_RQH (RQH denotes request-with-high-priority). When allocating VC credits the traffic source is configured to manage counters properly when sending "linked operations." If only one of the command or data components is ready to be sent, both command and data credits are consumed before sending either component. Doing so avoids a potential deadlock in which an unlinked message exhausts remaining VC credits and prevents the second component from entering the mesh network and re-associating at the destination switch.

One context in which the lock and unlock operations of a pthread library could be used is when a multi-threaded program is executing on multiple processor cores. For some such programs, the threads of that program, which may potentially contend for the same locks, are each scheduled to execute on a different processor core. Thus, each processor core is executing at most a single thread from that particular program. But, each processor core may be switching among threads from any number of programs that may be executing on that processor core. So, if a particular thread on a processor core enters the sleep state, the kernel is then able to schedule a thread of a different program to execute on that processor core. While such an ability for threads to sleep may be useful for efficient processing, the overhead processing in the kernel associated with entering and leaving the sleep state may have a significant impact if the duration of that overhead processing is comparable to the time spent in the sleep state (e.g., for short critical sections).

To resolve the potential issue of significant overhead processing associated with the kernel-based sleep mechanism, the lock operation can be altered. In some embodiments, the modified lock operation is provided "in software" by modifying the standard pthread library into a modified pthread library (with a modified lock routine, and optionally a modified unlock routine). In other embodiments, the modified lock operation is provided "in hardware" by modifying the actual atomic operation that is performed by circuitry within the processor after a primitive atomic operation is invoked by the lock routine of the standard pthread library. Before describing these modifications, the standard lock (and unlock) operations will be described. In either case, whether the processor is configured by modified circuitry or is configured by modified software being executed by that processor, the overhead associated with the sleep state can be reduced or avoided.

In some implementations of a pthread library, the lock operation is configured to attempt to acquire a lock using a primitive atomic operation, and the unlock operation is configured to release a lock using the same or another primitive atomic operation. For example, the primitive atomic operation used by the lock operation can be performed by executing a primitive compare-and-swap (CAS) instruction; and the primitive atomic operation used by the unlock operation can be performed by executing a primitive swap (SWP) instruction. Alternatively, in other implementations, different primitive instructions can be used. For example, a pair of primitive instructions called 'load-locked' (also called 'load-link') and 'store-conditional' may be used for lock and unlock operations. In different implementations, the same primitive instruction can be used by either the lock or unlock operation. For example, the primitive atomic operation used by the unlock operation may performed by executing the primitive CAS instruction but with different arguments from those used by the lock operation. These operations of these instructions are "primitive" in the sense that they are part of an instruction set that is at a lower level than the operations that are part of the pthread library.

The following is an example of an implementation of a primitive CAS instruction, which can be invoked by CAS (Xs, Xt, memptr):

temp=*memptr
   if (Xs=*memptr)
     memptr=Xt
   Xs=temp For this CAS instruction, the argument memptr is a pointer that points to the memory address storing a value associated with the primitive atomic operation performed by this primitive instruction. The arguments Xs and Xt are the expected old value and the new value, respectively (typically stored in registers). The value temp is a temporary value used for performing the swap. The operation first compares the expected old value Xs with the actual old value loaded from the contents of the memory address pointed to by memptr, and then stores the new value as the new contents of the memory address, only if the expected old value matches the actual old value. The actual old value is then returned in the register corresponding to the argument Xs. This operation is "atomic" because the software that invokes the CAS instruction (e.g., a lock operation in the pthread library) has a guarantee that all of the steps will be performed as a single action relative to any other operations.

The following is an example of an implementation of a SWP instruction, which can be invoked by SWP(Xs, Xt, memptr):

Xt=*memptr
*memptr=Xs

For this SWP instruction, the argument memptr is a pointer that points to the memory address storing a value associated with the primitive atomic operation performed by this primitive instruction. The arguments Xs and Xt are values to provide and receive the swapped values, respectively (typically stored in registers). The value loaded from the contents of the memory address pointed to by memptr is stored in Xt, and the value Xs is stored as the new contents of the memory address. This operation is "atomic" because the software that invokes the SWP instruction (e.g., an unlock operation in the pthread library) has a guarantee that all of the steps will be performed as a single action relative to any other operations.

In an alternative invocation of the SWP instruction, only two arguments are provided instead of three arguments: SWP(X, memptr). In that invocation, the value X is swapped with the contents of the memory address pointed to by memptr, in which case a temporary value can be used, as shown above for the CAS instruction:

temp=*memptr
*memptr=X
X=temp

Another aspect of these primitive CAS and SWP instructions is that they can be invoked with either 'acquire semantics' or 'release semantics', which provide to the processor information about whether or how reordering of instructions may be used. This information may be used in the lock/unlock management techniques, as described in more detail below.

An example of a lock operation that uses a primitive atomic operation is the following, where LOCK is a pointer to a memory location whose content represents the state of the lock (e.g., a stored value of 0 represents an 'unlocked state', a stored value of 1 represents a 'locked state', and a stored value of 2 represents a 'contended lock state'). (Any text after the '//' delimiters are comments about the preceding code.)

Standard Lock Operation:

```
oldLockValue = CAS(0, 1, LOCK)
if (oldLockValue >= 1) // already locked
do {
    oldLockValue = CAS(1, 2, LOCK) // indicate the lock as contended
    sleep
} while (CAS(0, 2, LOCK) >= 1) // loop until lock is acquired
```

In this routine for the lock operation, the primitive atomic operation of the CAS instruction is used. The returned oldLockValue will be 0 if the lock was previously unlocked, in which case, the initial attempt to acquire the lock was successful, and the routine ends. The returned oldLockValue will be 1 or 2 of the lock was previously locked, in which case, the body of the if-statement will be performed, which is a do-while loop. If oldLockValue was 1 (no contention), it will be changed to 2 to indicate contention using the CAS instruction with appropriate arguments. Before a subsequent attempt to acquire the lock, the 'sleep' command triggers the kernel to place the thread attempting the lock operation into the sleep state. After the kernel activates the thread again by waking it from the sleep state, the lock operation will perform the CAS instruction within the condition check of the do-while loop (i.e., repeatedly attempting the instruction after each interval in the sleep state) until the lock is successfully acquired. In other examples of the standard lock operation, the code can be optimized in various ways. For example, within the do-while loop, if oldLockValue was already equal to 2 (indicating contention) then the CAS(1, 2, LOCK) does not need to be performed.

An example of an unlock operation (also using a primitive atomic operation) is the following.

Standard Unlock Operation:
oldLockValue=SWP(0, LOCK)
if (oldLockValue==2)
    wake In this routine for the unlock operation, the primitive atomic operation of the SWP instruction is used. A program using the unlock operation of the pthread library is assumed to be written such that there is no contention for the thread that holds a lock to perform an unlock operation on that lock. So, the SWP instruction can be assumed to always succeed in storing the value 0 at the LOCK memory address. But, the returned oldLockValue will either be 1 if there is currently no other thread waiting to complete a lock operation, or 2 if there is currently at least one other thread waiting (or "contending") to complete a lock operation. If there is another thread contending (i.e., an oldLockValue of 2), then the 'wake' command triggers the kernel to activate a thread in the sleep state (if there are any).

When these routines for the lock and unlock operations use the primitive atomic operations, it is possible for any given thread that is attempting to acquire a given lock to be placed into the sleep state if the previous attempt to acquire the lock fails. The significant performance cost of the kernel-based procedures of entering and leaving the sleep state one or more times can be reduced or avoided completely by using 'active spinning'.

Active spinning is achieved by using a modified lock operation, either in hardware or in software, as mentioned above. For modifying the lock operation in software, examples of a modified lock operation, and a corresponding modified unlock operation, will first be described. For modifying the lock operation in hardware, an example of a modified atomic operation that is used within the routine for the standard lock operation, instead of the primitive atomic operation, will then be described.

An example of a modified lock operation of a modified pthread library is the following.

Modified Lock Operation:
while (CAS(0, 1, LOCK)==1)//spin (in software) until lock is acquired In this routine for the modified lock operation, it is not necessary to detect contention, so the primitive atomic operation is simply repeatedly attempted without ever entering the sleep state, also called 'indefinite active spinning'.

An example of a modified unlock operation of a modified pthread library is the following.

Modified Unlock Operation:
SWP(0, LOCK)

In this routine for the modified unlock operation, there is no need to wake any threads, since no threads are placed into the sleep state during attempts of the lock operation.

In some embodiments, it is useful to avoid the need to modify the pthread library. The standard lock operation of the standard pthread library can be used for invoking the primitive atomic operation, but active spinning can still be achieved in hardware by using a modified atomic operation after the primitive atomic operation is invoked (e.g., after the CAS instruction is issued). But, the since hardware may not have access to all of the information about the nature of the software that is being executed, it may not be possible to determine with absolute certainty whether a given instruction, such as a CAS instruction is being used for a lock or unlock operation or for some other purpose. So, the hardware can be configured with a prediction mechanism that is able to predict with relatively high certainty whether a given instruction is associated with a lock operation that should be modified in hardware to use active spinning mechanism. The prediction circuitry may also predict whether a given instruction is associated with an unlock operation that should be assigned a higher priority than any outstanding lock operations to use the traffic prioritization mechanism. For example, issue logic within the pipeline 104 can be configured to include dedicated prediction circuitry that predicts when an instruction is associated with a lock operation or an unlock operation, as follows.

When a CAS(X, Y, memptr) instruction is issued, prediction circuitry checks the supplied arguments X and Y (stored in registers accessible to the prediction circuitry) to determine if X<Y. If X<Y, then the prediction circuitry has identified an instruction that is predicted to be associated with a lock operation. However, if X>Y, then the prediction circuitry has identified an instruction that is predicted to be associated with an unlock operation. Additionally, there may be other instructions that can also be identified by the prediction circuitry as being associated with a lock or unlock operation. For example, in some embodiments, any SWP instruction issued with release semantics (i.e., (all load and store operations prior to that instruction are globally visible by all other processor cores), and any store-release register STLR instruction, are also identified as belonging to a subset of instructions that are predicted to be associated with an unlock operation. While some of these predictions may not always be correct, they are likely to be correct with a high enough accuracy that the described benefits are still captured. In some embodiments, the prediction may be able to identify all instructions actually associated with lock or unlock operations (i.e., no false negatives), but may falsely identify some other instructions (i.e., some false positives). Other confirming steps may also performed by the prediction circuitry. For example, the prediction circuitry may check to ensure that the argument memptr actually points to an address previously identified as storing a given lock.

For active spinning in hardware, in response to predicting a lock operation, instead of the routine given above, after an invocation of the primitive CAS instruction by CAS(Xs, Xt, memptr), a hardware implementation of a modified atomic operation is repeatedly attempted until the lock is acquired, thus achieving indefinite active spinning within dedicated circuitry of the processor. Normally, a software implementation of CAS(Xs, Xt, memptr) swaps the value in *memptr with Xt if the old data in *memptr matches Xs. The old data —irrespective of the swap—is placed in Xs. With a hardware implementation, the hardware will continuously attempt to perform the swap (that is, swap *memptr with Xt if the old data in *memptr matches Xs) until the swap succeeds. A potential problem is, if the operation were to update Xs with the old *memptr value when the swap fails, then it would change the architecturally/software-visible state, which would lead to incorrect operation. Instead, with active spinning in hardware, Xs is not updated if the swap doesn't succeed and the instruction is re-issued in the pipeline (and the re-issue is transparent to software).

This hardware lock operation does not necessarily require any modification to the software executing on the processor core. Since this modified atomic operation places a return value of 0 in the register storing Xs (to be received as oldLockValue by the software lock operation), it appears to software that the lock operation was successful. This is acceptable because the hardware has taken over and will not continue execution of additional software instructions of the thread that performed the lock operation until after the lock has been acquired. Of course, other threads can execute on other processor cores so that the holder of the lock can release the lock.

For both the hardware and software modified lock operation, an alternative to the indefinite active spinning embodiments are 'limited active spinning' embodiments. In limited active spinning, instead of repeatedly attempting to acquire the lock for an indefinite number of attempts, the lock operation repeatedly attempts to acquire the lock for a limited number of attempts. For example, after a predetermined threshold in the number of attempts (e.g., 20 attempts), or the amount of time that has passed (e.g., measured in clock cycles), the modified lock operation can be configured to allow the kernel to place the thread into the sleep state, as in the standard lock operation. The overhead associated with this kernel-based sleep mechanism may be less detrimental at that point because the amount of time that the lock has been held by a single thread (and therefore the amount of time within the critical section) has already been determined to be long.

Figure 2:
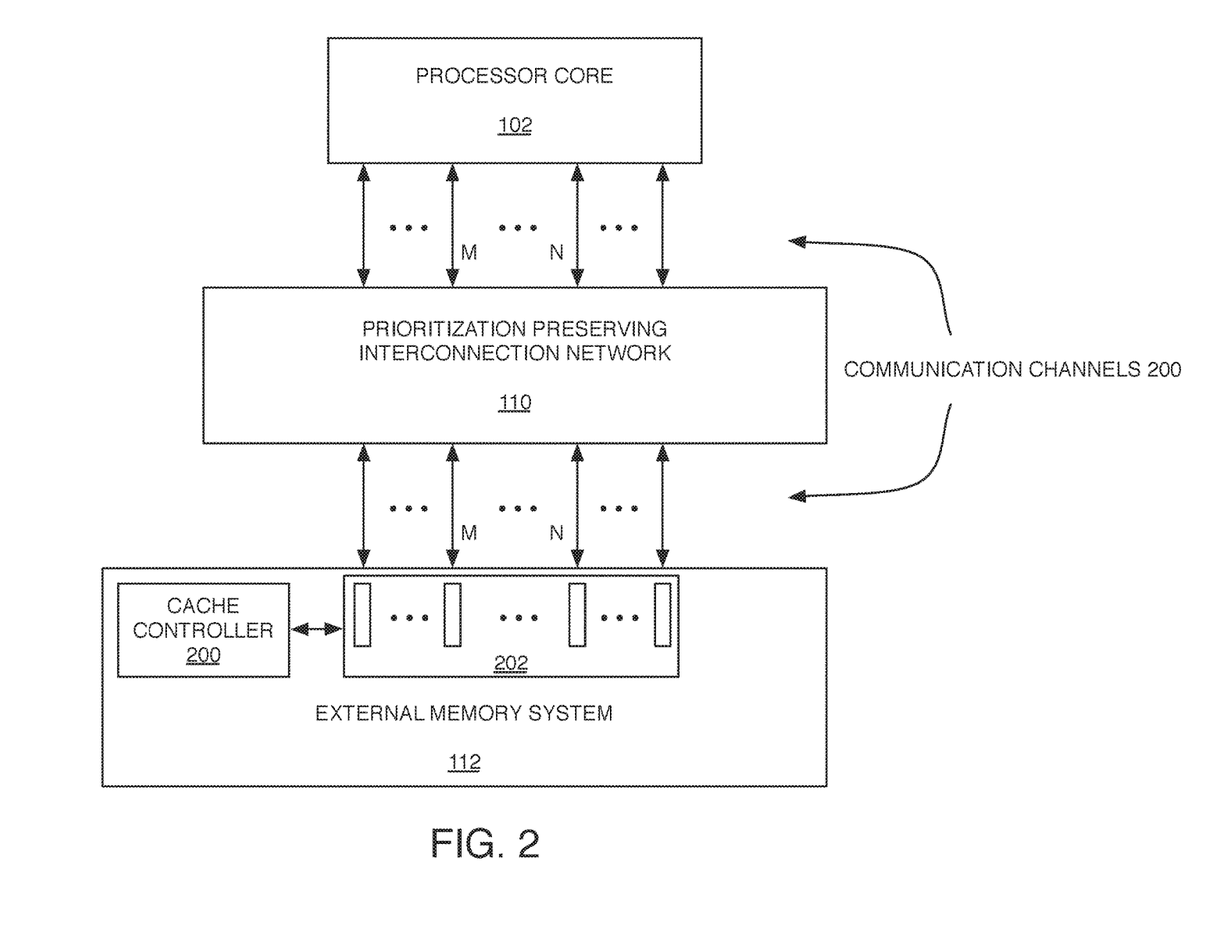
FIG. 2 is a schematic diagram illustrating traffic prioritization.

FIG. 2 shows an example of the traffic prioritization mechanism in the context of a set of separate communication channels for a particular processor core 102. In some embodiments, the separate communication channels are provided over an entire path between the processor core 102 and the LLC 120. As long as the relative prioritization among these channels is preserved within the processor core 102, throughout the interconnection network 110, and within the external memory system 112, then the unlock operations will not be improperly blocked behind a lock operation, which would cause a situation in which progress is delayed or deadlocked. In the illustrated example, paths through the preserving interconnection network 110 are provided using a set of communication channels 200 including Channel N and Channel M, where a priority of Channel N is higher than a priority of Channel M. Among the different types of operation messages that use the communication channels, all operation messages associated with an unlock operation are assigned to Channel N, and all operation messages associated with a lock operation are assigned to Channel M.

In some embodiments, the communication channels originate within the pipeline 104, for example, starting at any pipeline stage after a pipeline stage that accesses the one or more register files 106. The communication channels within the external memory system 112 can be managed by a cache controller 200, which receives operation messages into a priority queue 202. Some implementations of the priority queue 202 can be configured to use separate queues for each different priority level, for example, each queue receiving operation messages from a corresponding communication channel. The operation messages are taken from the priority queue 202 in a first-in/first-out (FIFO) order from the highest priority queue that is not empty. So, if a message associated with an unlock operation (according to the prediction mechanism) arrives into the priority queue 202, it would be handled before any messages associated with a lock operation that arrived into the priority queue 2002 earlier, since those operation messages are in a higher priority queue (from Channel N). Alternatively, in implementations of the priority queue 202 that uses a single queue with stored operation messages tagged by priority, the cache controller 200 can be configured to dequeue operation messages tagged with the highest priority in a FIFO order.

Other operation messages associated with different operations other than lock or unlock may also need to be prioritized in a particular manner. For example, if there is an operation message for a store operation resident in a write buffer of the processor core 102 and destined for the same cache block that is being targeted by the memory pointer of an unlock operation (i.e., storing a lock state), then that operation message can be prioritized as well (e.g., using Channel N). In the absence of such prioritization of such store operations destined for the same cache block that stores the lock state, the store operations would suffer the same slowdown as the lock operations, and thus would not reap the whole benefit of the prioritization scheme.

Although a "request" (i.e., an operation message containing a request) can be prioritized, the portion of the system configured to perform the prioritization is also configured to maintain the same program ordering (the portion of the executing program ordering that is required by the architecture) with respect to earlier requests on the lower priority channel, in certain cases. As an example, if an earlier request on the lower priority channel has been already sent to the same address as the request that is going to be prioritized, then that order is maintained. Maintaining the order can be implemented, for example, by making sure that any earlier requests that need to be observed ahead of the request being prioritized are completed before the system schedules the prioritized to request. Other ordering mechanism are also possible.

Also, for instructions identified as being associated with an unlock operation, there could be a number of pending requests, that have been queued or issued (and not completed), before an unlock operation is identified. When the unlock operation is identified, it is possible to retroactively "raise" the priority of these requests as well (while making sure the system still maintains program order). The system could be configured to raise the priority for all these requests, or could be configured to raise the priority of the requests that have not yet been issued.

Other embodiments may fall within the scope of the following claims, which do not necessarily include all of the features or advantages of the embodiments described above.

What is claimed is:

1. A method for managing instructions on a processor comprising a plurality of processor cores, the method comprising:
   executing a plurality of threads on the processor cores, each thread having access to a stored library of operations including at least one lock operation and at least one unlock operation; and
   managing instructions that are issued on a first processor core of the plurality of processor cores, for a first thread executing on the first processor core, the managing including:
      for each instruction included in the first thread and identified as being associated with a lock operation corresponding to a particular lock, determining if the particular lock has already been acquired for another thread executing on a processor core other than the first processor core, and if the particular lock has already been acquired, continuing to perform the lock operation for a plurality of attempts using a hardware lock operation different from the lock operation in the stored library, and if the particular lock has not already been acquired, acquiring the particular lock for the first thread, wherein the hardware lock operation performs a modified atomic operation that changes a result of the hardware lock operation for failed attempts to acquire the particular lock relative to a result of the lock operation in the stored library, and
      for each instruction included in the first thread and identified as being associated with an unlock operation corresponding to a particular lock, releasing the particular lock from the first thread.

2. The method of claim 1, wherein continuing to perform the lock operation for a plurality of attempts includes continuing to perform the lock operation for a plurality of attempts during which the first processor core is not able to execute threads other than the first thread.

3. The method of claim 2, wherein, after a predetermined threshold on the plurality of attempts, the first processor core places the first thread into an inactive state that enables the first processor core to temporarily execute threads other than the first thread until the first thread is placed back into an active state.

4. The method of claim 3, wherein, after releasing the particular lock from the first thread, the first processor core determines if there are any waiting threads executing on a processor core other than the first processor core that were placed into the inactive state after at least one attempt at acquiring the particular lock, and if so, places at least one waiting thread back into the active state.

5. The method of claim 1, wherein the hardware lock operation different from the lock operation in the stored library is used in response to the lock operation in the stored library being invoked.

6. The method of claim 1, wherein the hardware lock operation different from the lock operation in the stored library is performed by hardware within the first processor core that is configured to perform at least one of the plurality of attempts by re-issuing an instruction within a pipeline of the first processor core.

7. The method of claim 6, wherein the re-issuing of the instruction is transparent to software being executed by the first thread.

8. The method of claim 1, wherein interconnection circuitry configured to connect each processor core to a memory system of the processor is configured to preserve prioritization of selected messages associated with instructions identified as being associated with an unlock operation over messages associated with instructions identified as being associated with a lock operation.

9. The method of claim 1, wherein the first processor core includes circuitry configured to identify selected instructions as being associated with operations from the stored library, the identifying including, for a plurality of instructions included in a particular thread executing on the processor, identifying a first subset of the plurality of instructions as being associated with a lock operation based on predetermined characteristics of the plurality of instructions, and identifying a second subset of the plurality of instructions as being associated with an unlock operation based on predetermined characteristics of the plurality of instructions.

10. The method of claim 9, wherein the selected instructions are identified as being associated with operations from the stored library of operations using issue logic circuitry of a pipeline stage of the first processor core.

11. A processor comprising:

a plurality of processor cores, each configured to execute a plurality of threads, each thread having access to a stored library of operations including at least one lock operation and at least one unlock operation; and instruction management circuitry in at least a first processor core of the plurality of processor cores, the instruction management circuitry configured to manage instructions that are issued on the first processor core, for a first thread executing on the first processor core, the managing including:

for each instruction included in the first thread and identified as being associated with a lock operation corresponding to a particular lock, determining if the particular lock has already been acquired for another thread executing on a processor core other than the first processor core, and if the particular lock has already been acquired, continuing to perform the lock operation for a plurality of attempts using a hardware lock operation different from the lock operation in the stored library, and if the particular lock has not already been acquired, acquiring the particular lock for the first thread, wherein the hardware lock operation performs a modified atomic operation that changes a result of the hardware lock operation for failed attempts to acquire the particular lock relative to a result of the lock operation in the stored library, and for each instruction included in the first thread and identified as being associated with an unlock operation corresponding to a particular lock, releasing the particular lock for the first thread.

12. The processor of claim 11, wherein continuing to perform the lock operation for a plurality of attempts includes continuing to perform the lock operation for a plurality of attempts during which the first processor core is not able to execute threads other than the first thread.

13. The processor of claim 12, wherein, after a predetermined threshold on the plurality of attempts, the first processor core places the first thread into an inactive state that enables the first processor core to temporarily execute threads other than the first thread until the first thread is placed back into an active state.

14. The processor of claim 13, wherein, after releasing the particular lock from the first thread, the first processor core determines if there are any waiting threads executing on a processor core other than the first processor core that were placed into the inactive state after at least one attempt at acquiring the particular lock, and if so, places at least one waiting thread back into the active state.

15. The processor of claim 11, wherein the hardware lock operation different from the lock operation in the stored library is used in response to the lock operation in the stored library being invoked.

16. The processor of claim 11, wherein the hardware lock operation different from the lock operation in the stored library is performed by hardware within the first processor core that is configured to perform at least one of the plurality of attempts by re-issuing an instruction within a pipeline of the first processor core.

17. The processor of claim 16, wherein the re-issuing of the instruction is transparent to software being executed by the first thread.

18. The processor of claim 11, further comprising interconnection circuitry configured to connect each processor core to a memory system of the processor is configured to preserve prioritization of selected messages associated with instructions identified as being associated with an unlock operation over messages associated with instructions identified as being associated with a lock operation.

19. The processor of claim 11, wherein the first processor core includes circuitry configured to identify selected instructions as being associated with operations from the stored library, the identifying including, for a plurality of instructions included in a particular thread executing on the processor, identifying a first subset of the plurality of instructions as being associated with a lock operation based on predetermined characteristics of the plurality of instructions, and identifying a second subset of the plurality of instructions as being associated with an unlock operation based on predetermined characteristics of the plurality of instructions.

20. The processor of claim 19, wherein the selected instructions are identified as being associated with operations from the stored library of operations using issue logic circuitry of a pipeline stage of the first processor core.

* * * * *